3,817,879
PARTICULATE EXPANDABLE STYRENE POLYMERS COATED WITH A CARBOXAMIDE
Manfred Walter, Speyer, and Heinz Weber, Gruenstadt, Germany, assignors to Badische Anilin- & Soda-Fabrik Aktiengesellschaft, Ludwigshafen, Germany
No Drawing. Filed July 28, 1972, Ser. No. 276,129
Claims priority, application Germany, Aug. 7, 1971, P 21 39 686.1
Int. Cl. C08j 1/26
U.S. Cl. 260—2.5 B                    15 Claims

ABSTRACT OF THE DISCLOSURE

The invention relates to expandable styrene polymers having a short minimum mold residence time due to a coating of 0.05 to 2% by weight of a carboxamide of the formula R—CONH—R' which melts at from 60° to 110° C, R being alkyl or alkenyl of 7 to 21 carbon atoms and R' alkyl or alkenyl of 8 to 22 carbon atoms.

---

The invention relates to particulate expandable styrene polymers which, because of a coating with a N-alkylated carboxamide, require short minimum residence times in the mold in the production of foamed articles.

Polystyrene foam articles are usually prepared from pre-expanded polystyrene particles (i.e. polystyrene particles which have already been expanded but which still contain expanding agent and are therefore still expandable) in such a way that the particles are expanded in a double-walled mold having a perforated inner wall (the inner wall constituting the actual mold while the outer wall defines the steam chamber) by passing steam at a pressure of 0.5 to 1.2 atmospheres gauge into the steam chamber for a short time, i.e. are further expanded and at the same time are fused together under the internal pressure. The expanded material has to remain in the mold until the internal pressure generated by steam, expanding agent and air has fallen and the temperature has also fallen to such an extent that the molding removed from the mold retains its shape. The time required for this is called the cooling time or minimum mold residence time. This plays an important role in practice because the cycle time in the production of moldings and thus the capacity of the machines are mainly determined thereby. There is therefore great interest in keeping the minimum mold residence time as short as possible.

Consequently there has been no lack of attempts to shorten the minimum mold residence time. Coating expandable styrene polymer particles with organic compounds, for example paraffin oil, which is very effective in this respect, causes a decrease in expandability and an irregular cellular structure and also high moisture content of moldings prepared therefrom.

It has also already been proposed, for the purpose of shortening the minimum mold residence time, to coat expandable styrene polymer particles with a small amount of an aliphatic acid amide in which the nitrogen does not bear an aliphatic radical or bears one which has not more than three carbon atoms. In the case of small amounts of coating however the effect in shortening cooling time is slight. When larger amounts are used, the expanded moldings prepared therefrom exhibit irregular density distribution. Moreover for example oleamide, which is indicated as particularly favorable according to the prior art method, causes an increase in the loss of expanding agent of the expandable polystyrene so that it is more or less unsuitable for storage.

Coating with carboxamides containing hydroxyl groups, which has also already been proposed—even although for another purpose—exhibits the same disadvantage.

The object of the present invention is to provide a process for shortening the minimum mold residence time of expandable styrene polymers which does not exhibit the said disadvantages.

The invention resides in particulate expandable styrene polymers having a short minimum mold residence time and being characterized by a coating of 0.05 to 2% by weight of a carboxamide melting at from 60° to 110° C. and having the formula R—CONH—R' in which R is alkyl or alkenyl of seven to twenty-one carbon atoms and R' is alkyl or alkenyl of eight to twenty-two carbon atoms.

The invention also resides in a process for the production of expandable molding material having a short minimum mold residence time which comprises coating particulate expandable styrene polymers with 0.05 to 2% by weight of a carboxamide melting at from 60° to 110° C. and having the formula R—CONH—R' where R is alkyl or alkenyl of seven to twenty-one carbon atoms and R' is alkyl or alkenyl of eight to twenty-two carbon atoms.

Styrene polymers in the context of this invention include polystyrene and copolymers of styrene with other ethylenically unsaturated copolymerizable compounds which contain at least 60% and preferably more than 75% by weight of polymerized styrene units. Examples of suitable copolymerization components are α-methylstyrene, nuclear halogenated styrenes, nuclear alkylated styrenes, acrylonitrile, esters of acrylic or methacrylic acid with alcohols of one to eight carbon atoms, N-vinyl compounds such as vinylcarbazole and maleic anhydride or small amounts of compounds which contain two polymerizable double bonds such as butadiene, divinylbenzene or butanediol diacrylate.

The styrene polymers may contain additives, for example flame retardants such as trisdibromopropyl phosphate, hexabromocyclododecane, chloroparaffin and synergists for flame retardants as for example ferrocene, highly decomposable organic peroxides, and also dyes, lubricants or fillers of all types. Nucleating agents for improvement of the cellular structure may also be present in the styrene polymers.

The particulate styrene polymers are prepared by conventional methods. They may be in bead form, in the form of cylindrical granules or in the form of lumps such as are obtained by grinding bulk polymers. The particles advantageously have a diameter of from 0.1 to 6 mm., particularly from 0.4 to 3 mm.

The styrene polymers contain one or more expanding agents in homogeneous distribution. Example of suitable expanding agents are normally gaseous or liquid hydrocarbons or halohydrocarbons which do not dissolve the styrene polymer and whose boiling point is lower than the softening point of the polymer. Examples of suitable expanding agents are propane, butane, pentane, cyclopentane, hexane, cyclohexane, dichlorodifluoromethane and trifluorochloromethane. The expanding agents are generally contained in the styrene polymers in amounts of from 3 to 15% by weight based on the polymer.

Minimum mold residence time is defined above. A short minimum mold residence time is defined as a minimum mold residence time which is shorter than that of an uncoated styrene polymer.

The essential feature of the present invention is the use of a carboxamide derived from a higher carboxylic acid and a higher amine as the coating agent.

In the formula R—CONH—R' of the carboxamides R and R' are preferably saturated and linear alkyl but they may also be unsaturated and/or branched. The melting point of the acid amide should be in the range from 60° to 110° C., preferably from 65° to 95° C. Mixtures of appropriate acid amides having a mixed melting point within the said range are also suitable even though the melting points of the individual components may lie outside the said range. Examples of suitable coating agents are stearic N-stearylamide, stearic N-oleylamide, oleic N-stearylamide, behenic N-stearylamide, behenic N-laurylamide, myristic N-stearylamide, myristic N-laurylamide, palmitic N-octylamide, and caprylic N-stearylamide. The amount of coating agent as a rule lies within the range from 0.05 to 2%, preferably from 0.1 to 0.6% by weight based on the styrene polymer. The effect of a given coating agent is greater the more finely powdered the acid amide is. When possible the particle size should be less than 100 microns and preferably less than 50 microns. Comminution may be effected in conventional manner by grinding for example in a ball mill.

The coating agent may also contain an addition of other substances, for example antistatic agents, flame retardants and/or substances which have an anti-tack effect during preexpansion such as zinc stearate or a condensate of melamine and formaldehyde.

The acid amides are present as a coating, at least to a predominant extent, in an extremely uniform distribution on the surface of the particulate expandable polystyrene. The way in which they are applied is not critical. They may be applied for example by simple tumbling of the acid amide powder onto the particulate expandable styrene polymer in a commercial powder mixer having rotating arms. It is also possible however to apply the acid amide from an aqueous dispersion or a solution in an organic solvent, and in this case the solvent or water has to be removed during application. Furthermore the amide may also be supplied to the bead polymerization mixture at the end or toward the end of suspension polymerization.

Styrene polymers coated in accordance with the present invention have the following advantages; the minimum mold residence times are within the range from 10 to 50%, normally from 15 to 35%, of the minimum mold residence times which are achieved with uncoated expandable styrene polymers.

Furthermore moldings prepared by the process according to the invention have a very uniform distribution of density. This is of great importance for example in the production of foam boards from blocks where certain minimum unit weights are required.

Finally the water absorption of coated expandable styrene polymers according to this invention is considerably less during expansion with steam than in the case of uncoated expandable styrene polymers, let alone expandable styrene polymers coated with paraffin oil.

None of these advantages were foreseeable.

The minimum mold residence times of the moldings may conveniently be determined by the following method: the preexpanded styrene polymer is expanded in a mold in the center of which a pressure probe is provided. The time is measured from the commencement of the cooling to the moment when the pressure inside the molding has fallen to 0.1 atmosphere gauge. It has been found by experience that it is only then that the molding can be removed from the mold without risk of postexpansion.

The value for unit weight distribution is determined from a block of expanded plastics having the dimensions 100 cm. x 100 cm. x 50 cm. from which a parallelepiped having the dimensions 15 cm. x 15 cm. x 50 cm. is cut from the middle of one large side face to the other and subdivided into ten portions having the dimensions 15 cm. x 15 cm. x 5 cm. The unit weight of each of these ten portions is determined and in this way the unit weight distribution from the middle of one large side face of the block to the other is obtained. Two magnitudes (the unit weight excess and the unit weight difference) are used as characteristics of the unit weight distribution curve thus obtained. These are defined as follows:

$$\text{Unit weight excess } (\%) = 100 \times \frac{\text{MUW} - \text{UWLP}}{\text{UWLP}}$$

(where MUW = mean unit weight and UWLP = unit weight of the lightest portion)

$$\text{Unit weight difference} = \frac{\text{UWHP} - \text{UWLP}}{\text{MUW}}$$

(where UWHP = unit weight of the heaviest portion).

The unit weight excess gives the percentage by which the density of the preexpanded particulate expandable styrene polymer must be higher if a certain minimum unit weight is to be guaranteed for the lightest board. The unit weight difference is a measure of the difference between the heaviest and lightest boards with reference to the mean unit weight.

The water content of the expanded plastics molding is obtained from the difference in weight between the weight of preexpanded styrene polymer and the weight of the molding freshly removed from the mold.

The loss of pentane during storage of the particulate expandable styrene polymers coated according to the invention is no more than it is with uncoated material so that they are just as capable of being stored as the latter.

Moldings prepared from styrene polymers coated in accordance with the invention are well fused and dimensionally stable.

The following Examples illustrate the invention. The percentages specified in the Examples relate to the weight of expandable styrene polymer.

EXAMPLE 1

An expandable polystyrene which has been prepared by bead polymerization, which consists of beads of a diameter of from 1.3 to 2.5 mm. and which contains 5.5% of pentane is coated in a mixer with 0.3% by weight of an acid amide to be used according to the invention. The acid amide is finely powdered and passed through a sieve having 0.1 mm. apertures. The coated expandable polystyrene is kept for twenty-four hours in a closed vessel. Then it is preexpanded in a continuously stirred preexpander by means of steam to a bulk density of about 18 g./l. The preexpanded material is stored for twenty-four hours and then expanded in an automatic 500-liter block mold, steaming being with steam at 0.8 atmosphere gauge for two minutes. The resultant block has an average of three cells per mm.

In comparative experiments, the above procedure is followed but the following coating agents are used instead of those according to the invention:

no coating agent
stearamide
oleamide
palmitamide
12-hydroxystearamide.

The results of the series of experiments are collected together in Table 1.

The following abbreviations are used in Table 1:

BCT = block cooling time in minutes
UW = unit weight in g./l. — mean over the whole block
UWE = unit weight excess in percent
UWD = unit weight difference
PLS = pentane loss during storage
WCM = water content in percent of the molding immediately after removal from the mold.

TABLE 1

| Coating agent (0.3% in each case) | BCT | UW | UWE | UWD | PLS | WCM |
|---|---|---|---|---|---|---|
| Stearic N-stearylamide | 19 | 18.7 | 3.8 | 0.07 | Normal | 4.3 |
| Stearic N-oleylamide | 22 | 19.5 | 3.1 | 0.06 | do | 4.8 |
| Stearic N-2-ethylhexylamide | 22 | 18.6 | 3.2 | 0.09 | do | 5.9 |
| Behenic N-stearylamide | 20 | 19 | 3.4 | 0.08 | do | 4.8 |
| Behenic N-laurylamide | 16 | 18.8 | 6.2 | 0.11 | do | 5.1 |
| Myristic N-stearylamide | 25 | 19.4 | 3.5 | 0.09 | do | 4.1 |
| Myristic N-laurylamide | 13 | 19 | 4.5 | 0.1 | do | 5.2 |
| Oleic N-stearylamide | 18 | 19.2 | 5.7 | 0.1 | do | 4.0 |
| Not coated | 99 | 16.8 | 14.0 | 0.38 | do | 10.1 |
| Stearamide | 41 | 18.0 | 5.8 | 0.16 | do | 6.4 |
| Oleamide | 21 | 18.6 | 15.3 | 0.45 | Increased | 11.0 |
| Palmitamide | 39 | 17.8 | 6.4 | 0.19 | Normal | 8.1 |
| 12-hydroxystearamide | 41 | 17 | 5.8 | 0.19 | Increased | 8.8 |

EXAMPLE 2

The exact procedure of Example 1 is followed except that other amounts of coating agent are chosen, namely 0.2% and 0.1%. The coating substances used are stearic N-stearylamide and (for comparison oleamide.

The results are collected in Table 2:

The following abbreviations are used in Table 2:

SNS=stearic N-stearylamide
OA=oleamide
n=normal
i=increased
si=slightly increased.

TABLE 2

|  | Coating agent | | | |
|---|---|---|---|---|
|  | SNS | | OA | |
| Amount, percent of coating agent | 0.2 | 0.1 | 0.2 | 0.1 |
| Block cooling time (minutes) | 27 | 32 | 32 | 55 |
| Unit weight (g./l.) | 17.6 | 18.2 | 19 | 17.6 |
| Unit weight excess (percent) | 6.0 | 8.3 | 5.5 | 9.5 |
| Unit weight difference | 0.11 | 0.22 | 0.16 | 0.33 |
| Loss of pentane in storage | n | n | i | si |
| Water content of molding, percent | 3.4 | 4.3 | 8 | 6.8 |

EXAMPLE 3

An expanded polystyrene which has been prepared by extrusion granulation of a polystyrene melt containing pentane, which contains 5% of pentane and which consists of somewhat deformed cylinders having diameters of 2 mm. and lengths of from 2 to 4 mm. is coated in a mixer with 0.3% of steric N-stearylamide. The acid amide is finely powdered and passed through a sieve having 0.1 mm. apertures. The coated expandable polystyrene is kept for twenty-four hours in a closed vessel. Then it is preexpanded in a continuously stirred preexpander by means of steam to a bulk density of about 21 g./l. The preexpanded material is kept for twenty-four hours and then expanded in an automatic 500 liter block mold, steaming being for two minutes with steam at 0.8 atmosphere gauge. The expanded plastics block formed has an average of two cells per mm.

In two comparative experiments (a) stearic N-stearylamide is replaced by stearamide and (b) no coating is applied. The loss in pentane of unexpanded beads during storage is normal in all cases. The results are given in Table 3 below.

UC=uncoated;
SNS=coated with 0.3% stearic N-stearylamide;
SA=coated with 0.3% of stearamide.

TABLE 3

|  | UC | SNS | S |
|---|---|---|---|
| Cooling time in minutes | 170 | 53 | 120 |
| Cooling time in percent | 100 | 31 | 70 |
| Unit weight in g./l. | 20.8 | 21.8 | 22.4 |
| Unit weight excess in percent | 24.6 | 7.4 | 22.3 |
| Unit weight difference | 0.63 | 0.20 | 0.57 |
| Water content of molding in percent | 10 | 6.2 | 6.5 |
| Agglomeration during preexpansion [1] | 1.0 | 0.0 | 1.7 |

[1] The proportion in percent by weight of the preexpanded material which cannot pass through a sieve having 20 mm. apertures.

We claim:

1. A particulate expandable styrene polymer having a short minimum mold residence time which is characterized by a coating of 0.05 to 2% by weight of a carboxamide melting at from 60° to 110° C. and having the formula R—CONH—R' in which R is alkyl or alkenyl of seven to twenty-one carbon atoms and R' is alkyl or alkenyl of eight to twenty-two carbon atoms.

2. A particulate polymer as claimed in claim 1 of which the particles have a diameter of 0.1 to 6 mm.

3. A particulate polymer as claimed in claim 1 of which the particles have a diameter of 0.4 to 3 mm.

4. A particulate polymer as claimed in claim 1 in which the carboxamide has a melting point of from 65° to 95° C.

5. A particulate polymer as claimed in claim 1 in which the amount of carboxamide is from 0.1 to 0.6% by weight based on the styrene polymer.

6. A particulate polymer as claimed in claim 1 in which the carboxamide is used in the form of a powder having a particle size of less than 100 microns.

7. A particulate polymer as claimed in claim 6 wherein the said particle size is less than 50 microns.

8. A process for the production of expandable molding material having short minimum mold residence times which comprises coating a particulate expandable styrene polymer with from 0.05 to 2% by weight of a carboxamide melting at from 60° to 110° C. and having the formula R—CONH—R' where R is alkyl or alkenyl of seven to twenty-one carbon atoms and R' is alkyl or alkenyl of eight of twenty-two carbon atoms.

9. A process as claimed in claim 8 wherein the particles have a diameter of 0.1 to 6 mm.

10. A process as claimed in claim 8 wherein the particles have a diameter of 0.4 to 3 mm.

11. A process as claimed in claim 8 wherein the carboxamide has a melting point of from 65° to 95° C.

12. A process as claimed in claim 8 wherein the amount of carboxamide used is from 0.1 to 0.6% by weight based on the styrene polymer.

13. A process as claimed in claim 8 wherein the carboxamide is used in the form of powder having a particle size of less than 100 microns.

14. A process as claimed in claim 13 wherein the said particle size is less than 50 microns.

15. A particulate polymer as claimed in claim 1 wherein said carboxamide is a member selected from the group consisting of stearic N-stearylamide, stearic N-oleylamide, stearic N-2-ethylhexylamide, behenic N-stearylamide, behenic N-laurylamide, myristic N-stearylamide, myristic N-laurylamide, and oleic N-stearylamide.

References Cited

UNITED STATES PATENTS

| 3,429,737 | 2/1969 | Marsden | 260—2.5 B |
| 3,389,097 | 6/1968 | Ingram et al. | 260—2.5 B |
| 3,480,570 | 11/1969 | Roberts et al. | 260—2.5 B |
| 3,637,538 | 1/1972 | Heald | 260—2.5 B |

MURRAY TILLMAN, Primary Examiner

M. FOELAK, Assistant Examiner

U.S. Cl. X.R.

117—100 R; 260—28.5 A, 28.5 B, 32.6 R, 45.7 P, 45.7 R, 45.75 R, 855